United States Patent Office
3,272,590
Patented Sept. 13, 1966

3,272,590
SEPARATION OF Hf AND Zr VALUES BY SOLVENT EXTRACTION
William H. Owens, Milton, Fla., assignor, by mesne assignments, to Pittsburgh Plate Glass Company
No Drawing. Filed Mar. 15, 1962, Ser. No. 180,045
4 Claims. (Cl. 23—22)

This invention concerns the recovery of hafnium and/or zirconium. It more particularly involves separating titanium from zirconium and hafnium.

Zircon ore is one recognized natural source of hafnium. Such ore has the composition $ZrO_2 \cdot SiO_2$ and contains a minor amount of hafnium, probably in the form of $HfO \cdot SiO_2$. Also present are small concentrations of impurities such as oxides of titanium, iron, columbium, thorium, uranium and other heavy metals.

In recovering useful forms of zirconium and hafnium from such ores, according to one proposed process, the ore is heated with alkali metal hydroxide or alkali metal carbonate at an elevated temperature sufficiently high to convert silica to a water soluble form and to produce water insoluble alkali metal zirconate. Substantial amounts of silica are removed from this mixture by water extraction. The remaining solids (containing essentially all of the zirconium and hafnium) are treated with acid such as sulfuric acid or like acid to solubilize the zirconium and hafnium. Insolubles, usually high in silica content, are separated from the solution of zirconium and hafnium.

One procedure for utilizing the thus obtained zirconium and hafnium sulfuric acid solution involves an ammonia or ammonium hydroxide treatment followed by solution in nitric acid. By extraction with an organic solvent such as tributyl phosphate, the zirconium and hafnium values in such nitric acid solution (probably a solution of zirconyl and hafnyl nitrate) may be separated into more highly purified form. However, titanium contamination is not avoided during such purification.

For example, a nitric acid solution of zirconium and hafnium (probably as zirconyl and hafnyl nitrates) may be extracted with tributyl phosphate to recover substantially all zirconium and hafnium values in the tributyl phosphate. Such extraction leaves an aqueous phase substantially free of zirconium and hafnium values in which many contaminants are concentrated. Thus, substantial purification is accomplished. This purification, however, does not extend to titanium, e.g., the tributyl phosphate extracts titanium along with the zirconium and hafnium. This tendency of titanium to be extracted along with zirconium and/or hafnium extends to those extractions used to resolve zirconium and hafnium.

Thus, it is possible to separate zirconium and hafnium using an extraction system of tributyl phosphate and nitric acid such that the hafnium concentrates in the nitric acid fraction and the zirconium is separated into the tributyl phosphate fraction. Titanium which is present, however, appears in both fractions. As a consequence, neither zirconium nor hafnium sufficiently free of titanium are readily obtained. Even when such a hafnium-nitric acid fraction (free or substantially free of zirconium) is extracted with tributyl phosphate, an undesirable titanium content is encountered in the hafnium-tributyl phosphate fraction.

According to this invention, the difficulties involved in obtaining zirconium and/or hafnium free of undesirable titanium contamination are in the main circumvented most effectively. By virtue of the present invention, titanium may be separated with high selectivity from hafnium and/or zirconium, thus providing hafnium and zirconium substantially free of titanium. Under optimum conditions, there is little if any loss of zirconium or hafnium.

It now has been discovered that titanium values are effectively extracted from zirconium and/or hafnium values by adding to the extraction system a peroxidizing agent, notably hydrogen peroxide. This peroxidizing agent apparently converts the titanium (probably present as titanyl ion) to a pertitanic acid form. Thus, it is found that addition of hydrogen peroxide to an extraction system of an organic extractant such as tributyl phosphate and aqueous acid, notably nitric acid, will result in the distribution of titanium values in the nitric acid fraction under conditions which otherwise lead to titanium distributing in the tributyl phosphate. A major portion, often substantially all, of the titanium values distributes in the nitric acid fraction while hafnium and/or zirconium distribute in the organic extractant fraction, e.g., tributyl phosphate. From the organic extractant fraction, titanium poor hafnium or zirconium is readily recovered.

Consumption of hydrogen peroxide or like peroxide agent in the performance of this invention is economically tolerable. For each mole of hydrogen peroxide (or equivalent of other peroxidizing agent) approximately two moles of titanium usually are extracted in the aqueous acid fraction. Typical titanium contamination in hafnium rarely exceeds 15 or 20 percent by weight of the hafnium. Thus, the peroxide cost is small compared to the value of purified hafnium.

In the practice of an embodiment of this invention, an organic solution (e.g., a tributyl phosphate solution) of hafnium, zirconium and titanium values is introduced into a central stage of a multistage extraction system such as a central area of a vertical extraction tower. A further portion of the organic solvent is introduced into a lower stage of the column, often near or at its bottom, below the central area. Aqueous acid, notably nitric acid, is fed into an upper stage of the column. Hydrogen peroxide is added along with the acid solution.

There is thus established in the liquid extracting system countercurrently moving streams of aqueous acid and organic solvent. In the vertical extraction column, an upwardly flowing stream of organic extractant and a downwardly flowing aqueous nitric acid stream are established. Due to addition of hydrogen peroxide, the downwardly flowing stream of aqueous nitric acid which is ultimately withdrawn from a lower extremity of the column contains a substantial portion of the titanium values introduced into the column, quite frequently substantially all of the titanium. The organic extractant phase is withdrawn from an upper, usually the uppermost, stage of the column and contains the zirconium values.

Depending upon conditions prevailing in the multistage extraction such as the concentration of nitric acid, the ratio of organic solvent to aqueous phase and stage into which the organic solution is fed, it is possible to cause the hafnium to distribute selectively in either the organic or the aqueous phase. Thus, the stream of organic extractant emanating from an upper section of a vertical multistage column may have concentrated therein the hafnium values of the feed along with the zirconium values. Alternatively, the hafnium values may be principally distributed in the nitric acid phase and thus separated from the zirconium values.

In another embodiment hereof involving multistage extraction, the organic solution is fed to an intermediate stage and conditions otherwise established so as to produce two fractions, one of which (aqueous fraction) is predominantly of hafnium and the other (organic fraction) preponderantly of zirconium. Such hafnium fraction usually contains the preponderant titanium content. This titanium content may be separated from the hafnium by a further extraction, usually a multistage extraction with organic solvent, by including hydrogen peroxide or the like in the system to thus cause titanium to distribute in the non-organic fraction while hafnium distributes in the organic fraction.

Quite frequently in connection with methods for producing zirconyl nitrate, it is advantageous to extract the mixture of zirconium, hafnium and titanium from an aqueous acid solution of their salts into an appropriate organic extractant and to feed the resulting organic extract to an intermediate stage of a vertical multistage extraction column. Besides making it feasible to feed the salts to an intermediate stage of a multistage extraction column, and thus provide for a nitric acid scrubbing section in an upper portion of the column, the formation of this organic solution of the metals provides for a means of removing substantial quantities of impurities, thus reducing the work load placed upon the column.

Formation of such organic solution is achieved simply by mixing the solvent with the aqueous solution of metal salts, e.g., the aqueous solution of salts produced by reaction of the frit with nitric acid such as described in copending application Serial No. 93,872, and separating the organic phase. If desired, this can be repeated several times in order to insure complete removal of the zirconium and hafnium values from the solution. Usually, a single extraction suffices.

As a rule, the amount of solvent is controlled so as to extract substantially all of the zirconium and hafnium while minimizing extraction of other impurities including metal impurities. Nevertheless, despite observing such precautions, a substantial amount of titanium is extracted. In accordance with this invention, the amount of titanium which is extracted into the organic phase can be appreciably minimized by adding to such extraction system a peroxidizing agent, notably hydrogen peroxide.

In most instances, the titanium and hafnium values in the compositions extracted in accordance herewith are in the form of salts, usually of strong acids, e.g., hafnyl nitrate, hafnyl sulfate, hafnyl chloride, hafnyl perchlorate, etc. Such is the case with zirconium values when they too are involved.

The following example illustrates the manner in which the present invention may be practiced:

*Example I*

Using six laboratory mixer-settlers in series, a tributyl phosphate solution of hafnium containing titanium was subjected to multistage extraction at room temperature, about 25° C. After bringing the system to near equilibrium, 480 milliliters of tributyl phosphate containing 0.259 pound of hafnium per gallon and 1.18 pounds per gallon free nitric acid were introduced into the fourth stage. Into the sixth stage, 120 milliliters of tributyl phosphate and 40 milliliters of aqueous nitric acid containing 8 pounds per gallon of nitric acid were introduced while 160 milliliters of aqueous nitric acid containing 3.7 pounds per gallon of nitric acid were fed to the first stage as scrub, thus providing for three stages of nitric acid scrub and two stages of tributyl phosphate extraction.

The tributyl phosphate fraction removed from the first stage contained by weight approximatley 6,000 parts titanium per 1,000,000 parts of hafnium, or about 91 percent of the titanium values present in the feed.

This extraction was duplicated except that included with the nitric acid fed to the first stage as scrub acid was 3 milliliters of 30 percent by weight hydrogen peroxide. The organic tributyl phosphate fraction removed from the first stage contained by weight only 10 parts titanium per 1,000,000 parts of hafnium. This striking reduction in titanium content of the organic hafnium bearing fraction was the consequence of introducing hydrogen peroxide into the extraction system.

Various organic solvent extractants other than tributyl phosphate may be used in performing the extraction process of this invention. In general, such organic extractants are substantially insoluble in aqueous acid. They include those solvents mentioned in U.S. Patent No. 2,753,250 granted to H. A. Wilhelm et al. July 3, 1956. Included are liquid trialkyl phosphate such as tricresyl phosphate, trihexyl phosphate, trioctyl phosphate, oxidecyl hydrogen phosphate, dioctyl phenyl phosphate, didecyl phenyl phosphonate, dihexyl phenyl phosphate, butyl phenyl phosphonate and the like. Extraction of hafnium and zirconium, especially aqueous solutions of their chlorides complexed with thiocyanate can be achieved through the use of an organic extractant such as ether or methyl isobutyl ketone.

Under many conditions of operation such solvents frequently are diluted with other matterials, including liquid hydrocarbons such as hexane, normal hexane, normal octane or the like. Other solvents include various ethers such as diethyl ether, dibutyl ether or ketones such as mesityl oxide, diisopropyl ketone or cyclohexanone or alcohols, such as secondary amyl alcohol or isoamyl alcohol or esters such as isoamyl acetate or butyl acetate are suitable.

In lieu of aqueous nitric acid, other aqueous acids including sulfuric, hydrochloric and acetic acid, by way of illustration, are of use.

There is thus wide latitude permissible in the choice of the liquids used to provide the extraction system. As a rule, essentially immiscible (mutually insoluble) liquid components are used which provide for two separable (usually phase separable) fractions. Sufficient difference in density of the respective fractions facilitates such separation, and in operation of a multistage vertical extraction column, is required to provide for the flow of liquids.

Moreover, besides hydrogen peroxide, other materials which contain a peroxygen linkage, notably peroxidizing agents such as sodium peroxide, peracetic acid, potassium peroxide, barium peroxide, isopropyl peroxydicarbonate and like peroxydicarbonate esters are contemplated. It is particularly convenient to add the peroxidizing agent as an aqueous solution when one liquid component of the extraction system is aqueous, e.g., aqueous acid. The invention, however, may be performed relying upon any expedient for adding hydrogen peroxide or the like to the extraction system.

While the invention has been described by reference to specific details of certain embodiments, it is not intended the invention be construed as limited to such details except insofar as they appear in the appended claims.

I claim:
1. In the process of separating titanium from the group consisting of hafnium and zirconium wherein a water-insoluble organic solvent solution of hafnium and zirconium values containing titanium values as a contaminant which normally remains dissolved in said solutions of hafnium and zirconium is introduced into a extraction system comprising countercurrent flowing liquid components consisting of an aqueous acid phase and a water-insoluble organic solvent phase, the improvement for preventing contamination of said hafnium and zir- conium values in said organic solvent phase which comprises introducing a peroxidizing agent into said extraction system with said aqueous acid phase of said system in an amount of one mole of said peroxidizing agent to approximately two moles of the titanium value content of said solution of hafnium and zirconium values, separating said organic solvent and aqueous acid phases, recovering said organic solvent phase containing at least said zirconium values substantially free of said titanium contaminant, and recovering said aqueous acid phase containing substantially all of said titanium contaminant.

2. The process of claim 1 wherein the zirconium, hafnium and titanium values are in the form of salts of a strong acid.

3. The process of claim 1 wherein the water-insoluble organic solvent is a water-insoluble alkyl or aryl phosphate.

4. The process of claim 1 wherein the peroxidizing agent is hydrogen peroxide.

References Cited by the Examiner

UNITED STATES PATENTS

| 2,211,119 | 8/1940 | Hixson | 23—23 |
| 2,753,250 | 7/1956 | Wilhelm | 23—22 X |
| 2,860,031 | 11/1958 | Grinstead | 23—23 X |
| 3,006,719 | 10/1961 | Miller | 23—18 X |
| 3,069,232 | 12/1962 | Greenberg et al. | 23—22 X |
| 3,095,270 | 6/1963 | Korach et al. | 23—18 X |

OSCAR R. VERTIZ, *Primary Examiner.*

MAURICE A. BRINDISI, *Examiner.*

H. T. CARTER, *Assistant Examiner.*